United States Patent Office 2,794,821
Patented June 4, 1957

2,794,821

PROCESS FOR PREPARATION OF O,O-DIALKYL-ALKANETHIOPHOSPHONATES

Gerard A. Loughran, Stamford, and Edwin O. Hook, New Canaan, Conn., assignors to American Cyanamid Company, New York, N. Y., a corporation of Maine No Drawing. Application November 17, 1953,
Serial No. 392,758

5 Claims. (Cl. 260—461)

This invention relates to methods of preparation of O,O-diesters of alkane thiophosphonic acids and, more particularly, to the production of esters of this class which are soluble in hydrocarbon oils and possess antioxidant and anti-corrosion properties therein. Many of the esters prepared by the methods of the present invention are also useful as plasticizers, insecticides, fungicides, synthetic lubricants and as chemical intermediates in the preparation of higher molecular weight phosphonic acids.

These O,O-diesters of alkane thiophosphonic acid may be defined by the following structural formula:

$$R-P(=S)(OR^1)(OR^2)$$

wherein R is an alkyl radical having at least five carbon atoms; and $R^1$ and $R^2$ are members of the group consisting of alkyl, alkaryl, aryl, aralkyl and cycloalkyl radicals.

In the reaction of phosphorous heptasulfide ($P_4S_7$) with phenols and aliphatic and aromatic alcohols, O,O-diesters of thiophosphonic acid are formed which have the following structural formula:

$$H-P(=S)(OR^1)(OR^2)$$

wherein $R^1$ and $R^2$ have the definitions previously described.

We have found that if these diesters are reacted under suitable conditions with various unsaturated hydrocarbons, such as olefins and particularly 1-alkenes, the reaction proceeds very easily without the use of expensive alkaline or peroxide catalysts, as might be anticipated from a consideration of the reaction. The unsaturated hydrocarbons add very easily to these compounds containing a —PH linkage, whereby an O,O-diester of an alkane thiophosphonic acid is derived.

The exact proportions of the reactants is not a limiting or critical factor and substantially equimolecular quantities have been reacted with satisfactory results. It has been found, however, that a slight excess of the unsaturated hydrocarbon brings about a more desirable reaction rate as well as improved yields.

The temperature and time of reaction are similarly not limiting or critical and the general interdependent relationship of these factors is present wherein higher temperatures of reaction normally require less time, and vice-versa. Reflux conditions for varying times depending on the particular reactants have been found to be satisfactory.

Illustrative of the various aliphatic unsaturated hydrocarbons which can be used in the above-described reaction may be cited: dodecene-1; octene-1; pentene-1; hexene-1; octadecene-1; and the like.

Illustrative of the radicals which may be employed as $R^1$ and $R^2$ in the above structurally-defined compounds may be cited; methyl; ethyl; propyl; isopropyl; butyl; hexyl octyl; capryl; lauryl; octadecyl; 2-4-diamylphenyl; lauroyl phenyl; benzyl; phenyl; tolyl; cyclohexyl; and the like.

The above compounds and radicals have been cited as illustrative of the materials which can be used in the present invention and it is to be pointed out that such is not to be construed as limitative of the invention, but that corresponding and equivalent compounds and radicals may be used within the spirit of the inventive concept.

The invention will be further illustrated in more specific detail by the following examples. It should be understood, however, that although these examples may describe in more particular detail some of the very specific features of the invention, they are given primarily for purposes of illustration and the invention in its broader aspects is not to be construed as limited thereto.

EXAMPLE 1

*Reaction between dodecene-1 and O,O-diisopropyl thiophosphonate*

Thirty-seven grams of dodecene-1 and 36 grams of O,O-diisopropyl thiophosphonate were mixed at room temperature and heated at from about 120° C. to about 135° C. for approximately eleven hours. The unreacted low boiling mixture was distilled off under reduced pressure by means of a water pump. Twenty-seven grams of unreacted material was removed and the residual high boiling product weighted 47 grams. The removed product was distilled at 155–159° C. at 0.70 to 0.74 mm. The resulting material was O,O-diisopropyl dodecanethiophosphonate and had a refractive index $(n_D^{25})=1.4600$.

The product analyzed as follows:

Calculated for $C_{18}H_{39}PO_2S$:
  Percent phosphorous _____ 8.84
  Percent sulphur _____ 9.14

Found:
  Percent phosphorous _____ 8.84
  Percent sulphur _____ 9.60

An infrared curve showed that neither P—H nor P→O bonds were present. P—O—C bonds were present but no P—S—C bonds could be detected by this method.

A sample of the ester was heated with concentrated nitric acid at steam bath temperatures. The resulting product was a dibasic acid having an equivalent weight of 245. The theory for dodecanephosphonic acid is 250. A benzylthiuronium salt was prepared from this acid and had a melting point of 151–153° C. The salt analyzed as follows:

Calculated for $C_{20}H_{37}PO_3N_2S$:
  Percent nitrogen _____ 6.72
  Percent sulphur _____ 7.70

Found:
  Percent nitrogen _____ 6.95
  Percent sulphur _____ 7.72

EXAMPLE 2

*Reaction between octene-1 and O,O-diisopropyl thiophosphonate*

Sixty-four grams of O,O-diisopropyl thiophosphonate was stirred in a 1-liter, 3-neck flask and 79 grams of octene-1 was added. The mixture was refluxed for 18 hours at about 136° C. and stripped as in Example 1, resulting in a yield of 50 g. of the crude ester, which was O,O-diisopropyl n-octanethiophosphonate. 100 cc. of concentrated nitric acid was then added slowly, drop by drop. The reaction was vigorously exothermic. After the initial exotherm had subsided, the reaction mixture was stirred at 100° C. for 8 hours and then allowed to stand. Two layers resulted. The lower nitric acid layer was drawn off and the upper dark layer was treated with a mixture of 100 cc. of concentrated hydrochloric acid and 25 cc. of alcohol. The mixture was heated for 11 hours. The liquid was then stripped down to a dark brown oil which became an opaque brown crystalline solid upon cooling. It was recrystallized from heptane, separating as white plates which melted at 96.5–98.5° C. Its equivalent weight was found to be 194. (Theory for octanephosphonic acid is 194). An infrared curve was run and compared with that from 2-chlorobutane-1-phosphonic acid. Both curves were similar.

EXAMPLE 3

*Reaction between dodecene-1 and O,O-dibenzyl thiophosphonate*

The reaction set forth in Example 2 was carried out under conditions substantially as described therein, using 134 grams of dodecene-1 (0.8 mol) and 111 grams of O,O-dibenzyl thiophosphonate (0.4 mol). The resulting reaction product was O,O-dibenzyl n-dodecanethiophosphonate and was a neutral mobile liquid.

Although we have described but a few specific examples of our inventive concept, we consider the broad aspects of the same not to be limited to the specific substances mentioned therein but to include various other compounds of equivalent function and constitution as set forth in the claims appended hereto. It is understood that any suitable changes, modifications and variations may be made without departing from the spirit and scope of the invention.

We claim:
1. A method of preparing an O,O-diester of an alkanethiophosphonic acid having the formula

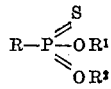

wherein R is an alkyl radical having from 5 to 18 carbon atoms and $R^1$ and $R^2$ are members of the group consisting of alkyl and aralkyl radicals which comprises heating at reflux temperatures a mixture of reactants consisting of an alkene-1 containing from 5 to 18 carbon atoms and an O,O-diester of a thiophosphonic acid of the formula

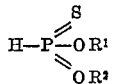

in which $R^1$ and $R^2$ are as defined above.

2. A method of preparing an O,O-dialkyl ester on an alkanethiophosphonic acid which comprises heating at reflux temperatures a mixture of reactants consisting of an alkene-1 containing from 5 to 18 carbon atoms and an O,O-dialkylthiophosphonic acid.

3. A method preparing O,O-diisopropyl dodecanethiophosphonate which comprises heating at 120°–135° C. a mixture of reactants consisting of dodecene-1 and O,O-diisopropyl thiophosphonate.

4. A method of preparing O,O-diisopropyl octanethiophosphonate which comprises heating at reflux temperatures of about 136° C. a mixture of reactants consisting of octene-1 and O,O-diisopropyl thiophosphonate.

5. A method of preparing O,O-dibenzyl dodecanethiophosphonate which comprises heating at reflux temperatures a mixture of reactants consisting of dodecene-1 and O,O-dibenzyl thiophosphonate.

References Cited in the file of this patent

UNITED STATES PATENTS

| | | |
|---|---|---|
| 2,478,390 | Hanford et al. | Aug. 9, 1949 |
| 2,653,161 | Ballard et al. | Sept. 22, 1953 |

FOREIGN PATENTS

| | | |
|---|---|---|
| 660,169 | Great Britain | Oct. 31, 1951 |
| 660,918 | Great Britain | Nov. 14, 1951 |